US010401913B2

(12) United States Patent
Mendoza et al.

(10) Patent No.: US 10,401,913 B2
(45) Date of Patent: Sep. 3, 2019

(54) MIXED REALITY HEAD MOUNTED DISPLAY DEVICE

(71) Applicant: Immerex Inc., Santa Clara, CA (US)

(72) Inventors: Jonathan Mendoza, San Francisco, CA (US); Toby Stopper, San Francisco, CA (US); Kevin Hoffman, San Francisco, CA (US); Ignazio Moresco, San Francisco, CA (US); Allen Yang, Fremont, CA (US)

(73) Assignee: Immerex Inc., Santa Clara, CA (US)

( * ) Notice: Subject to any disclaimer, the term of this patent is extended or adjusted under 35 U.S.C. 154(b) by 0 days.

(21) Appl. No.: 15/630,292

(22) Filed: Jun. 22, 2017

(65) Prior Publication Data

US 2018/0364766 A1  Dec. 20, 2018

Related U.S. Application Data

(63) Continuation of application No. 15/628,560, filed on Jun. 20, 2017.

(51) Int. Cl.
*G06F 1/16* (2006.01)
*G06F 3/01* (2006.01)
(Continued)

(52) U.S. Cl.
CPC ....... *G06F 1/1679* (2013.01); *G02B 27/0093* (2013.01); *G02B 27/017* (2013.01);
(Continued)

(58) Field of Classification Search
None
See application file for complete search history.

(56) References Cited

U.S. PATENT DOCUMENTS 8,352,046 B1  1/2013 Haller
2010/0259471 A1* 10/2010 Takano ............... G02B 27/017
                                                     345/156
(Continued)

FOREIGN PATENT DOCUMENTS

DE       202014105859 U1    4/2017

OTHER PUBLICATIONS

Silbert ("The PhoneStation uses your smartphone as a head-mounted display", 2014, https://www.engadget.com/2014/06/04/phonestation-head-mounted-display/).*
Naudus, Kris, "The OmniWear Arc is a haptic neckband for serious gamers", https://www.engadget.com/2016/10/18/omniwear-arc-hands-on/#/, Oct. 18, 2016.

*Primary Examiner* — Xin Sheng
(74) *Attorney, Agent, or Firm* — Perkins Coie LLP; Han-Wei Chen

(57) ABSTRACT

Disclosed are a Head mounted Display (HMD) device for use in mixed reality applications such as virtual or augmented reality. The disclosed HMD includes improvement to comfort and convenience of wearing. Convenience features include shifting portions of the HMD's heat generating and heavier components off the user's head and on to their neck, or neck and shoulders. Shifting components to the user's neck opens additional input schemes and enables the use of further feedback devices that improve the immersiveness of the mixed reality experience. An additional convenience feature is an adjustable visor that lifts up and down such that the user may view the real-world or the virtual-world without having to remove the HMD fully from their heads.

18 Claims, 10 Drawing Sheets

(51) Int. Cl.
  *G09G 3/00* (2006.01)
  *G02B 27/00* (2006.01)
  *G02B 27/01* (2006.01)
  *G06T 19/00* (2011.01)

(52) U.S. Cl.
  CPC ......... *G02B 27/0172* (2013.01); *G06F 1/163* (2013.01); *G06F 1/1635* (2013.01); *G06F 1/1654* (2013.01); *G06F 1/1681* (2013.01); *G06F 3/011* (2013.01); *G06F 3/012* (2013.01); *G06F 3/016* (2013.01); *G06T 19/006* (2013.01); *G09G 3/003* (2013.01); *G02B 2027/0178* (2013.01); *G06F 3/013* (2013.01)

(56) References Cited

U.S. PATENT DOCUMENTS

| | | | |
|---|---|---|---|
| 2011/0090135 A1* | 4/2011 | Tricoukes | G02B 27/0176 345/8 |
| 2012/0075169 A1 | 3/2012 | Iba | |
| 2012/0249741 A1 | 10/2012 | Maciocci | |
| 2016/0070110 A1* | 3/2016 | Ushakov | G08C 17/02 348/373 |
| 2016/0070234 A1* | 3/2016 | Lee | A44C 5/0007 368/282 |
| 2017/0068119 A1 | 3/2017 | Antaki | |
| 2017/0274282 A1 | 9/2017 | Nishi | |
| 2017/0351096 A1* | 12/2017 | Tsai | G02B 27/0176 |

\* cited by examiner

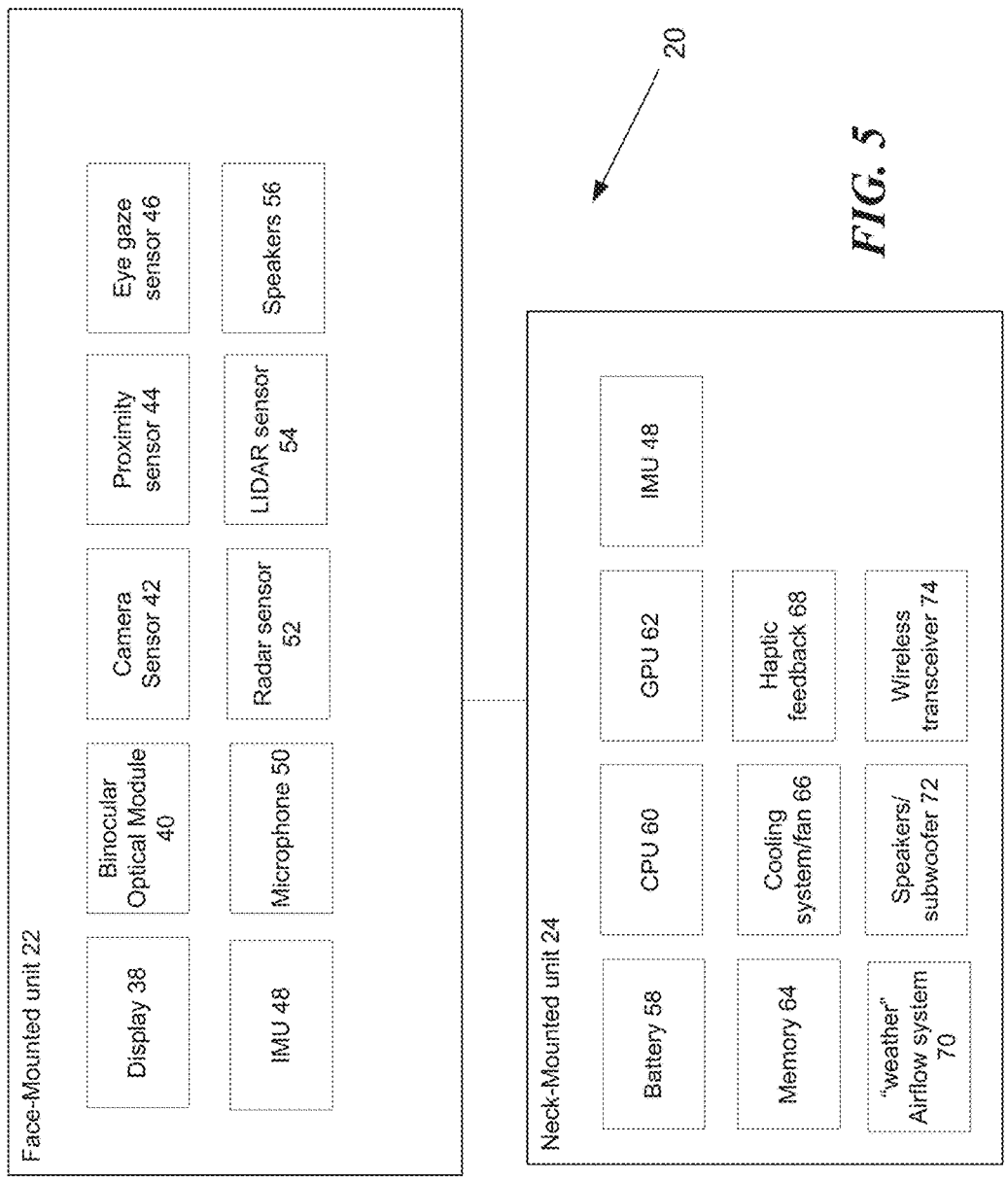

MIXED REALITY HEAD MOUNTED DISPLAY DEVICE

CROSS-REFERENCE TO RELATED APPLICATION

This application is a continuation of U.S. patent application Ser. No. 15/628,560, filed Jun. 20, 2017, which application is incorporated by reference herein in its entirety.

TECHNICAL FIELD

This disclosure relates to head mounted display devices and more particularly to the physical structure thereof.

BACKGROUND

Virtual reality (VR) and augmented reality (AR) visualization systems are starting to enter the mainstream consumer electronics marketplace. These devices are often bulky and limit the ability of the user to move comfortably or see.

BRIEF DESCRIPTION OF THE DRAWINGS

One or more embodiments of the present disclosure are illustrated by way of example and not limitation in the figures of the accompanying drawings, in which like references indicate similar elements.

FIG. 5 is a block diagram including a first embodiment of component positioning in a hybrid HMD.

DETAILED DESCRIPTION

In this description, references to "an embodiment," "one embodiment" or the like, mean that the particular feature, function, structure or characteristic being described is included in at least one embodiment of the technique introduced here. Occurrences of such phrases in this specification do not necessarily all refer to the same embodiment. On the other hand, the embodiments referred to also are not necessarily mutually exclusive.

Head mounted displays (HMD) are often used for virtual reality or augmented reality applications, often inclusively referred to as mixed reality. An engineering concern HMDs is often the ease of wearing. HMD's may be physically and visually restrictive, heavy, awkward, bulky hot, and disorienting. The present disclosure includes improvements upon these issues.

One way to improve upon mobility and comfort is to remove components from the user's head. This is sometimes done with backpacks or connections to external computers. However, these methods make it more difficult to market, sell all-in-one HMD devices, and cause the user to be tethered to external devices. The primary issue is removing weight, bulk, and heat from the user's head or face area. To achieve that, it is unnecessary to go so far as placing it on their back. Instead, the components that do not necessarily need to be on the user's face may be moved to their neck, and worn as a necklace.

Another issue is visibility. This issue is more particularly noticeable in immersive virtual reality applications. Current designs must be taken all the way off in order for a user to see the real world again. Thus having a display that can be adjusted to either be in front of the user's face (in use) or propped up on their forehead as if the HMD were a pair of glasses enables the user to view the real world again without having to concern themselves with tightness settings.

Figure 1:
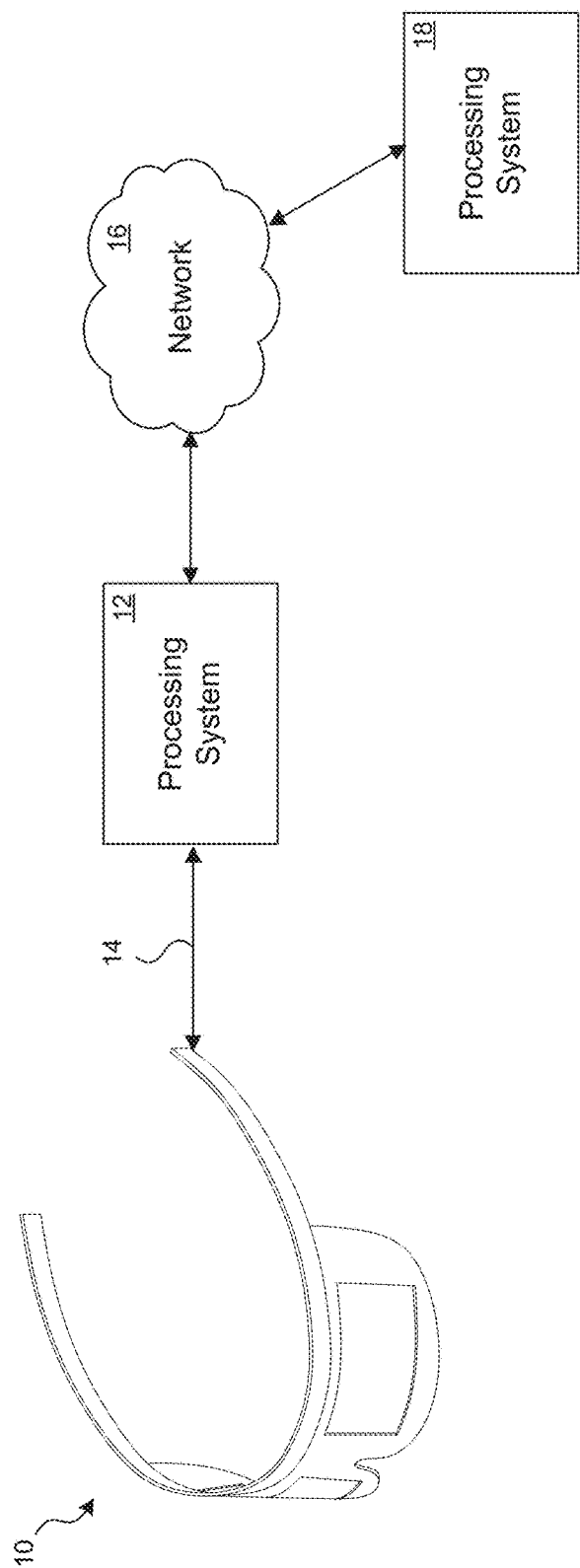
FIG. 1 illustrates an example of an environment including an HMD device.

FIG. 1 shows an example of an environment including a HMD device 1 that can implement the techniques introduced here. In the illustrated example, the HMD device 10 is configured to communicate data to and from a processing system 12 through a connection 14, which can be a wired connection, a wireless connection, or a combination thereof. In some use cases, the HMD device 10 may operate as a standalone device with an integrated processing system 12. In some use cases, the processing system 12 is external to the HMD 10.

The connection 14 can be configured to carry any kind of data, such as image data (e.g., still images and/or full-motion video, including 2D and 3D images), audio data (including voice), multimedia, and/or any other type(s) of data. The processing device 12 may be, for example, a game console, personal computer, tablet computer, smartphone, or other type of processing device. The connection 14 can be, for example, a universal serial bus (USB) connection, Wi-Fi connection, Bluetooth or Bluetooth Low Energy (BLE) connection, Ethernet connection, cable connection, DSL connection, cellular connection (e.g., 3G, LTE/4G or 5G), or the like, or a combination thereof. Additionally, the processing device 12 may communicate with one or more other processing systems 5 via a network 4, which may be or include, for example, a local area network (LAN), a wide area network (WAN), an intranet, a metropolitan area network (MAN), the global Internet, or a combination thereof.

The processing system 12 may further connect to a network 16, such as the Internet, a local area network (LAN), or a virtual private network (VPN). Through the network 16, the HMD device 10 may make use of a secondary processing systems 18.

Figure 2:
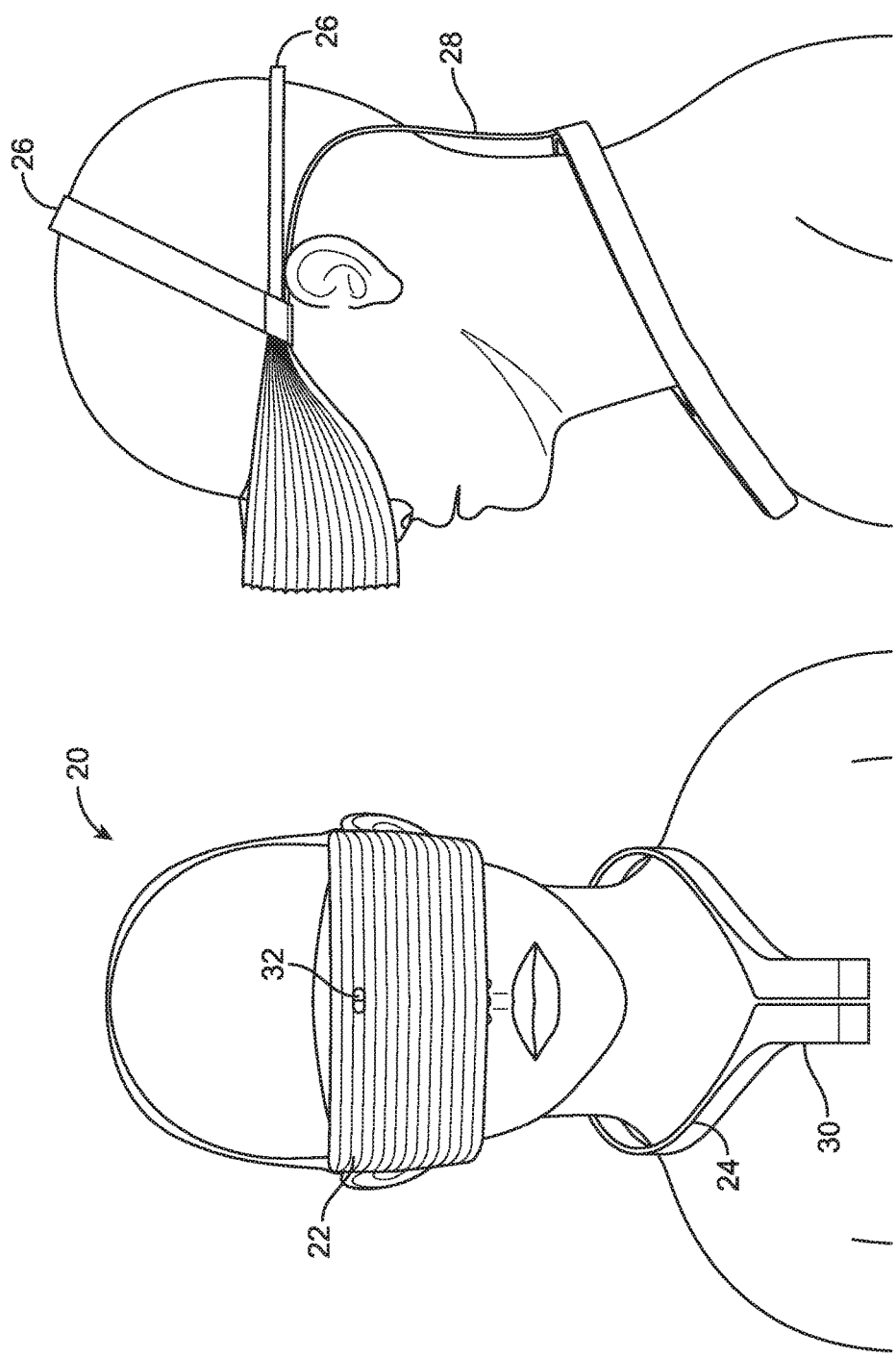
FIG. 2 illustrates a first embodiment of a hybrid, face and neck display device.

FIG. 2 illustrates a first embodiment of a hybrid, face and neck display device 20 (hybrid device). The hybrid device has a face-mounted unit 22 and a neck-mounted unit 24. The face-mounted unit 22 includes components that are sensory and control related (e.g., display, motion sensors, etc. . . . ). Conversely, the neck-mounted unit 24 includes the bulkiest components (e.g., the batteries). Some components are neither bulky/heavy but are also not relevant to sensory and controls (e.g., processors such as the CPU/GPU). These components may be places in either unit 22, 24 or both. In some embodiments, components not related to sensory or control apparatus are positioned in the neck-mounted unit 24.

The hybrid device 20 includes some additional enabling components. One such enabling component is a means for mounting the face-mounted unit 22 to the user's head/face. Such means is displayed in FIG. 2 via straps 26. Other than straps 26, the means for mounting may include a headband, a halo, clamps/clips, or a hat/helmet. The face and neck mounted units 22, 24 are communicatively connected to one another. This connection may be either wired or wireless. In FIG. 2, the connection is a cable 28. The cable carries both power and data between the units 22, 24.

The neck-mounted unit 24 in FIG. 2 is in a necklace configuration including a pendant 30. The necklace configuration may be wrapped, slid, or clamped around the user's neck. FIG. 2 also includes a face-unit mounted camera 32. The face-mounted unit 22 may include a number of sensors.

An advantage of the displayed embodiment is that the face-mounted unit is lighter and thus will fit more comfortably on the user's face. This enables the user to be more mobile during use. The neck-mounted unit 24 is significantly lighter than a backpack, but still enables weight to be removed from the face-mounted unit 22. Additionally, a more robust cooling system may be employed on the neck-mounted unit 24 than would otherwise be comfortable on a face-mounted unit 22. Vibrations created by a fan are more noticeable and irritating as felt through the skull than on the clavicle. Vibrations received through the skull are often audible (e.g., music played through a metal rod that is clenched in the teeth can be heard). Conversely, a user cannot hear weak vibrations through the clavicle.

Figure 3:
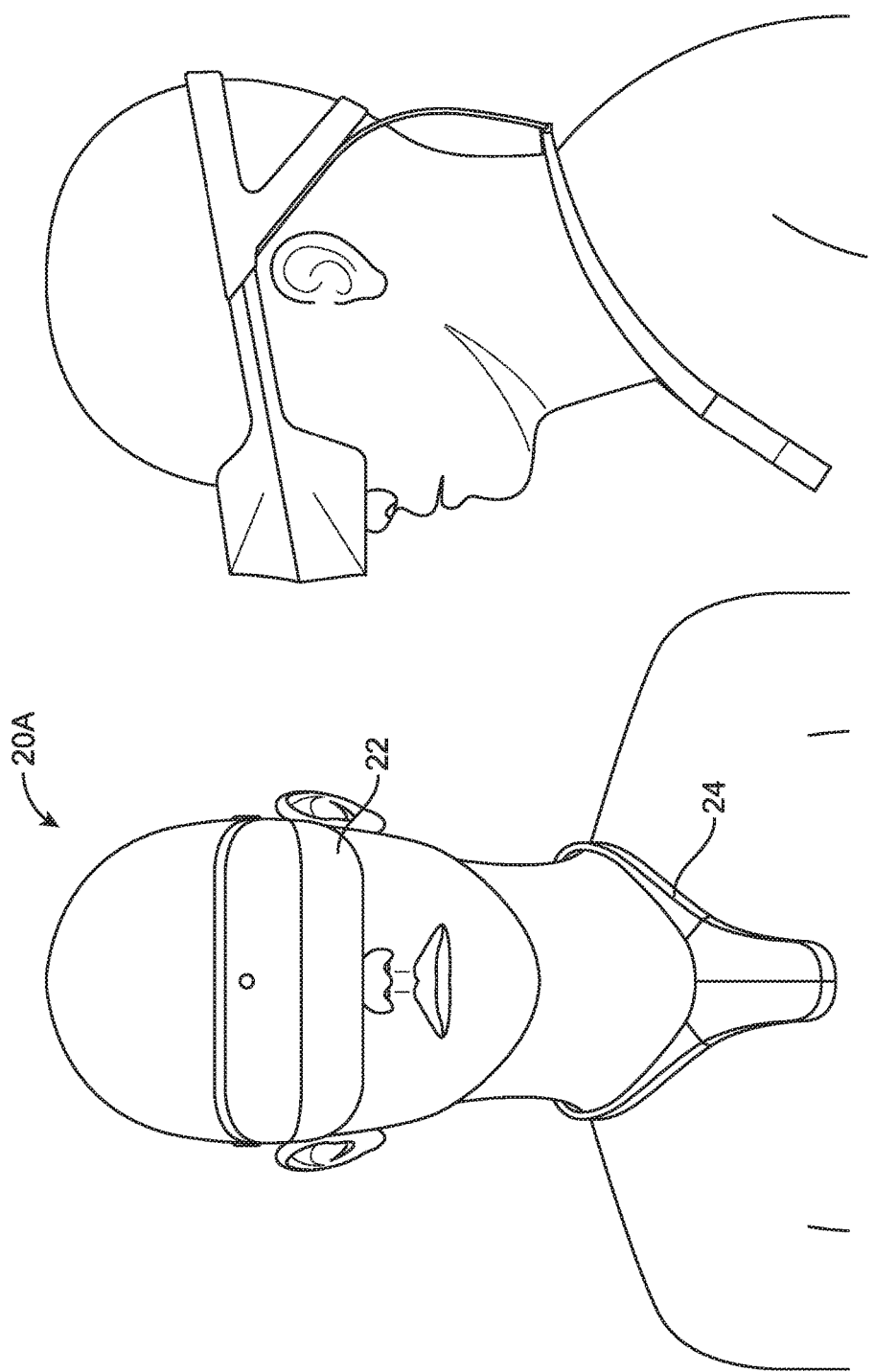
FIG. 3 illustrates a second embodiment of a hybrid, face and neck display device.

FIG. 3 illustrates a second embodiment of a hybrid, face and neck display device 20A. The figure is similar to the embodiment displayed in FIG. 2. Displayed is an alternate embodiment 20A of the means of mounting the face-mounted unit 22.

The "4" Figure series illustrates a number of embodiments for the neck-mounted unit 24.

Figure 4C:
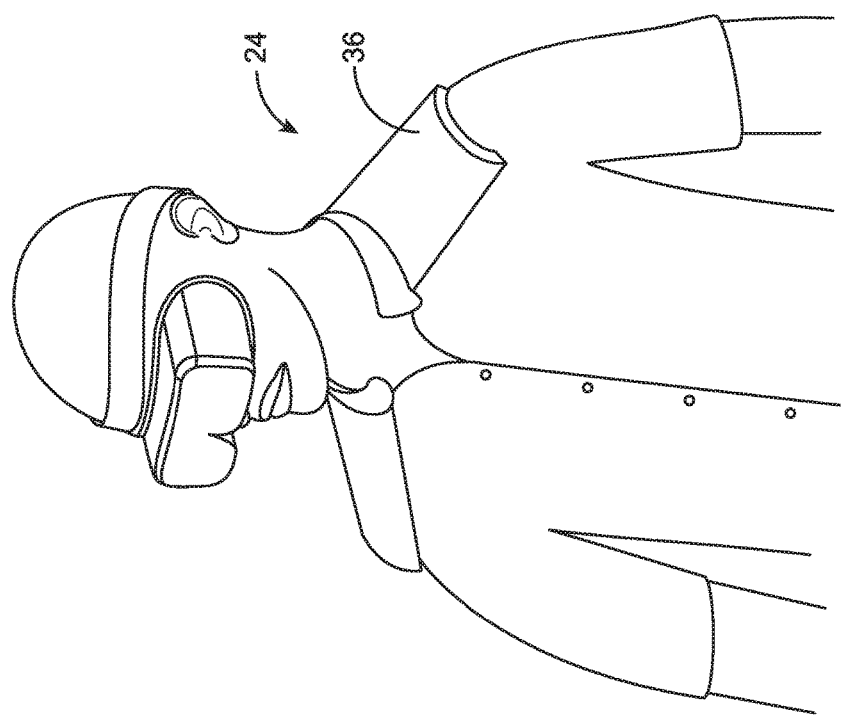
FIG. 4C illustrates a hybrid HMD device in a mantle configuration.
Figure 4A:
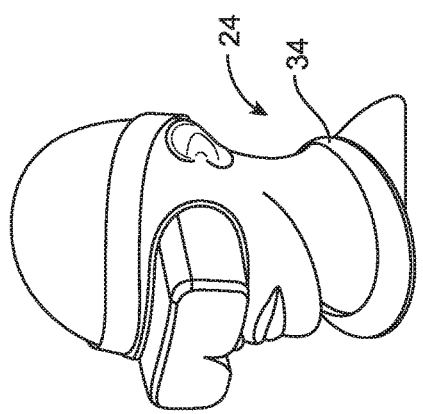
FIG. 4A illustrates a hybrid HMD device in a necklace configuration.

FIG. 4A illustrates a hybrid HMD device in a necklace configuration 34. The necklace configuration 34 wraps around the user's neck much like a necklace. In some embodiments, the necklace configuration 34 completely encircles the user's neck, once clasped. In other embodiments, the necklace configuration wraps partially around the user's neck. There are a number of ways of securing the necklace configuration 34 on the user including clasps, force fit, magnets, a hinge, or other methods known in adorning neck mounted wearables.

The necklace configuration 34 may position components within a hollow volume of the neck-mounted unit. The exact positioning of each component within the hollow volume may vary. In some embodiments, the components within the hollow volume are positioned to balance weight across the entire neck-mounted unit.

Figure 4B:
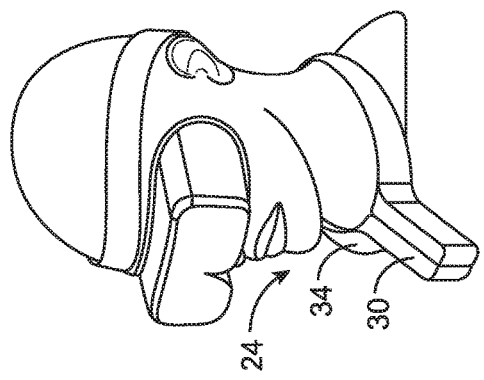
FIG. 4B illustrates a hybrid HMD device in a necklace and pendant configuration.

FIG. 4B illustrates a hybrid HMD device in a necklace and pendant configuration. The neck-mounted unit 24 is shown with a necklace configuration 34 and a pendant 30. The pendant 30 is primarily used for component storage. In this configuration the bulk of the weight of the neck mounted unit 24 is within the pendant 30. The pendant 30 may be constructed a number of ways including a fixed position in front of the user, a dangling position from the necklace 34 (including wired communication there between), multiple pendants, or other methods known in the art of adorning worn articles around the neck.

The pendant itself does not necessarily have to be positioned on the front, center of the user's neck. The weight of the components may be distributed at the back, on the sides, or evenly on either side.

FIG. 4C illustrates a hybrid HMD device in a mantle configuration 36. The mantle configuration 36 is notably more robust than either the necklace configuration 34, or the necklace and pendant configuration 30. The mantle configuration 36 expands across, and derives support from the wearer's shoulders. Use of a mantle shaped adornment provide the digital space in a hollow volume in which to position components, while still retaining a smaller profile that a backpack.

While other configurations may include the same additional components, the mantle configuration 36 is more readily configured for haptic feedback, jets of air or water used for improving an immersive experience, and speakers including bass tones or subwoofers. While it might not be preferable to feel vibration from a fan on one's skull (thereby "hearing" the fan), experiencing the pulsing of a subwoofer on one's shoulders can improve an immersive experience. The additional immersive experience components may be positioned on one or both shoulders of the mantle configuration 36.

FIG. 5 is a block diagram including a first embodiment of component positioning in a hybrid HMD 20 between the face-mounted unit 22 and the neck-mounted unit 24. The overall scheme in component positioning, with some exceptions, is to remove all components that do not need to be on the user's face, from the user's face. One of the primary components in an HMD is the display 38. The display 38, in operation, needs to be in front of the user's eyes, and therefore must remain on the face-mounted unit 22. In some embodiments, the display 38 is a portion of the mobile device such as a cell phone or tablet. In such embodiments, the face-mounted unit 22 comprises a housing where the mobile device may be inserted into the housing during use. Additionally, the face-mounted unit 22 may include a suite of sensors. The face-mounted unit 22 uses the sensors to either accept input or render output for user.

Sensors in the sensor suite include a binocular optical module 40, a front facing camera 42, the proximity sensor 44, an eye-gaze sensor 46, and inertial measurement unit (IMU) 48 or accelerometer, a microphone 50, a radar sensor 52, a LIDAR sensor 54, speakers 56, or other sensory equipment known in the art. The binocular optical module 40 refers to a set of lenses that adapt a display to be suited for view separately in each of two eyes, and very close up.

While these components may be used for multiple purposes, components such as the display 38, the binocular optical module 40, and the speakers 56 provide output to the user. Components such as the camera 42, the proximity sensor 44, the radar 52, or the LIDAR 54 are used to provide input to the HMD 20 that is environmentally based (i.e., not directly provided by the user). While these environmentally based input sensors may also be positioned on the neck-mounted unit 24, positioning the sensors on the user's face enable them to capture the environment within the line of sight of the user despite the orientation of the user's body.

Finally, components such as the eye-gaze sensor 46, the IMU 48, and the microphone 50 each collect direct user input. The eye gaze sensor 46 must be positioned on the face-mounted unit 22 and within proximity of the user's eyes in order to detect where the user's eyes are looking on the display. The microphone 50 may be positioned on the neck-mounted unit 24; however, placing the microphone closer to the user's mouth (i.e., their face) improves microphone performance.

The IMU 48 is positioned on the face-mounted unit 22 in order to detect the motion of the user's head. One advantage of moving heavy components from the user's face to their neck is that movement of the user's head will feel more natural. Detecting the movement of the user's head is important element in maintaining an immersive experience. The neck mounted unit 24 may also include IMU 48. Such inclusion of an additional IMU 48 enables mixed reality programs to isolate input types. For example, a first IMU 48 on the user's face detects orientation and positioning of the user's head, a second IMU 48 on the user's neck detects motion of the body.

The distinction between the two input types corresponds to input provided in many known controller based video games—one control to move a player's character (commonly left control stick or WASD keys), and a second control to direct the player character's point of view (commonly right control stick or mouse cursor). Isolating user input into more than one type and from multiple positions may provide increased performance. For example, if a user whips their head forward very quickly, the HMD 20 will not interpret this as forward motion, because the neck-mounted IMU 48 did not move.

In some embodiments, the IMU 48 includes matching components in both the face-mounted unit 22 and the neck-mounted unit 24 that make use of magnetic fields to determine their relation in positioning to one another. This provides high-performance detection for user had positioning and orientation.

The neck-mounted unit 24 includes the remaining components necessary to operate the HMD 20. Notably, these components include a battery 58 in some form of controller or processing unit. The controller may include a CPU 60, and/or a GPU 62. In some embodiments, processing features are not moved to the neck-mounted unit 24. Processors such as the CPU 60 and the GPU 62 may be built with a very small profile and do not weigh very much. Accordingly, the processing components may be placed in the face-mounted unit 22 or an additional unit, such as one positioned at the back of the user's head.

A number of other components may optionally be positioned in the neck-mounted unit 24. Such components include memory or storage space 64, a cooling system (fan) 66, a haptic feedback system 68, the simulated weather system (air jets/water jets) 70, speakers/subwoofers 72, a wireless transceiver (Bluetooth, Wi-Fi, near field communication, etc.), or other suitable devices known in the art. Components such as the battery 58 or processing cores 60, 62 often generate a lot of heat. In addition to management of the weight of the HMD 20 heat management poses limitations for the processing power of the HMD 20. The ability to include a fan 66 can improve the overall processing power of the HMD 20.

Haptic feedback systems are often not implemented on head mounted devices for comfort reasons. Placement of the haptic feedback system 68 on the neck-mounted unit 24 increases functionality without increasing user discomfort. Similarly, including simulated weather/environment systems 70, such as air jets or water jets, on a face-mounted device is difficult. This is due to the difficulty in obtaining a good angle at which to shoot the jet at the user. When mounted on the neck, the HMD 20 has more ability to angle the jets in usable ways. Air or fluid jets may have additional uses beyond replicating micro-weather. For example, the weather/environment system 70 may also create the sense of motion or scent. Perfumes or scented sprays may be emitted from the environment system 70. Further air jets can simulate the sensation of not only the movement or air, but the user's movement through the air (e.g., as if on a virtual motorcycle).

Similarly, subwoofers 72 or other larger speakers that are often difficult to include on a compact, face mounted device. The neck-mounted unit provides more surface area and an internal volume (to resonate sound waves) which in turn makes the use of subwoofers more feasible.

Wireless communication is also a relevant portion of modern computing and gaming. Thus, the inclusion of a wireless transceiver 74 in HMDs is beneficial. As the wireless communicator does not necessarily have to be mounted on the face of the user, optional placement on the neck reduces face-mounted components. The wireless transceiver 74 enables the HMD 20 to communicate with external networks and the Internet or additional peripherals, such as handheld controllers.

Figure 6:
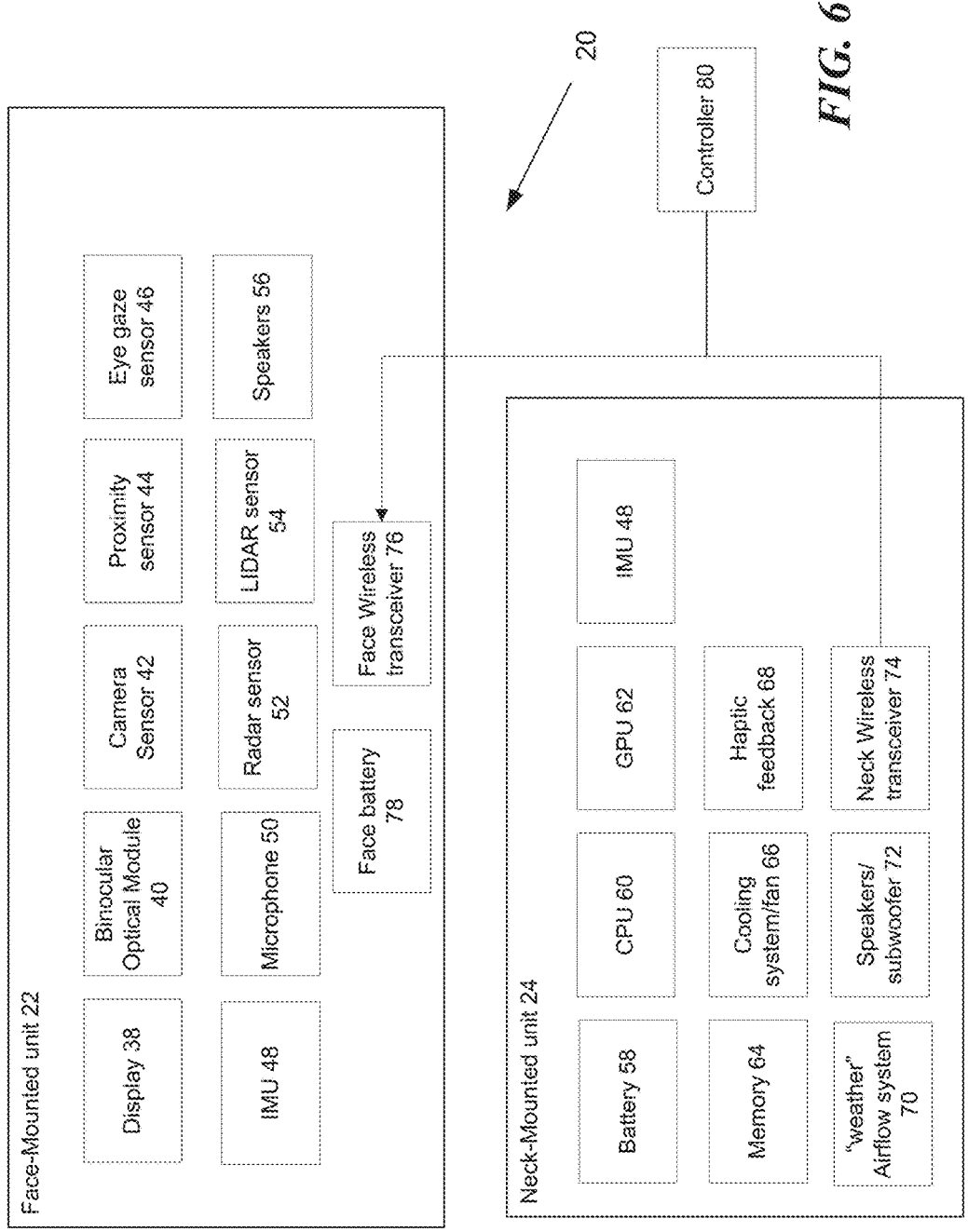
FIG. 6 is a block diagram including a second embodiment of component positioning in a hybrid HMD.

FIG. 6 is a block diagram including a second embodiment of component positioning in a hybrid HMD 20. FIG. 6 is similar to FIG. 5 with the addition of wireless communicators in both the face-mounted unit 22 in the neck-mounted unit 24. In some embodiments, communication between both units 22, 24 is wireless rather than wired. Wireless communication may include data, power, or both. In order to facilitate wireless communication, the wireless transceiver 74 of the neck-mounted unit 24 transmits signals to and from a face mounted wireless transceiver 76. Where power is not transferred, the face-mounted unit 22 additionally requires a face mounted battery 78 to operate.

The HMD 20 may additionally communicate with outside peripherals, such as a controller 80. Communication with the controller 80 may be wired or wireless.

Figure 7:
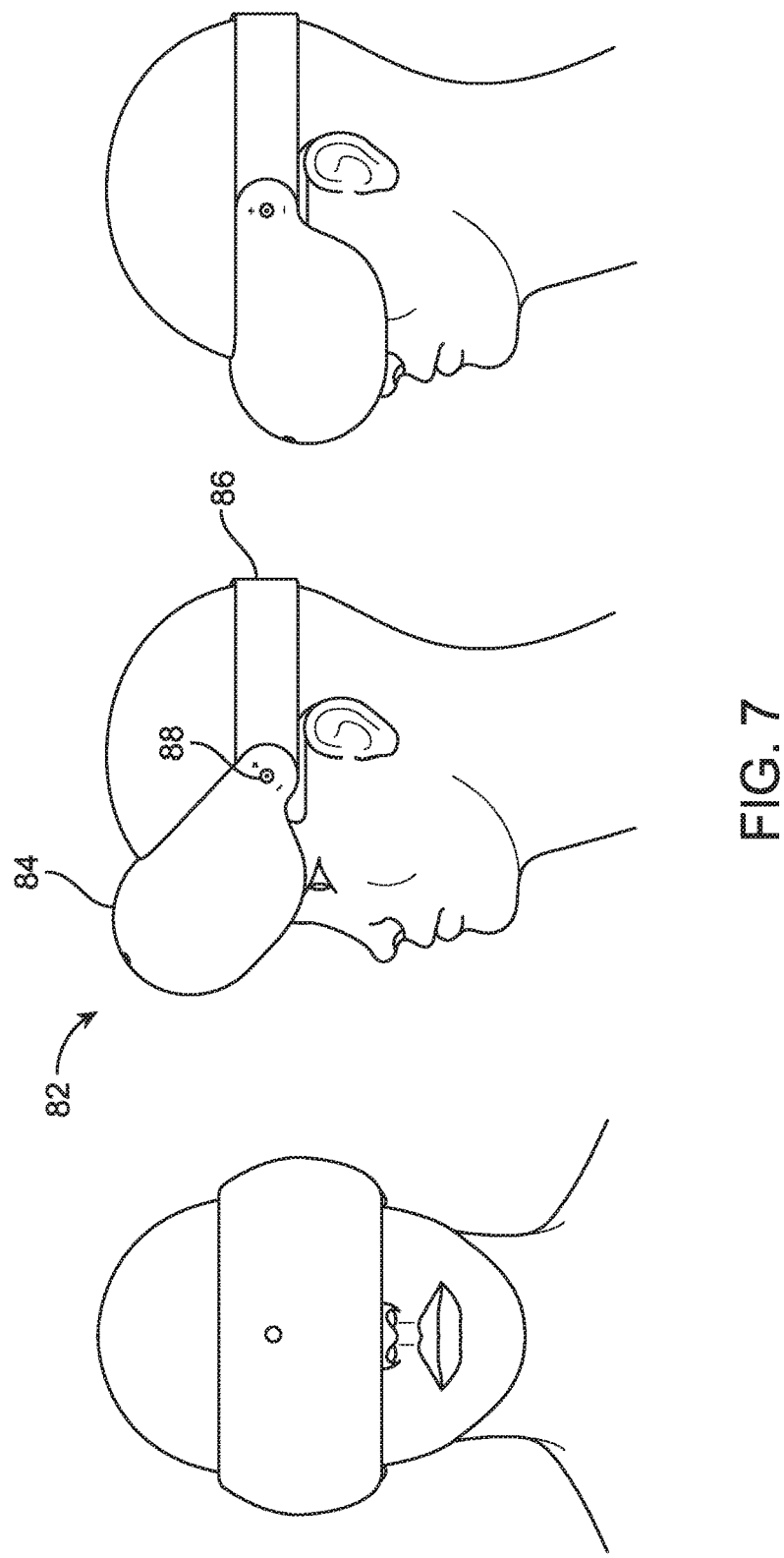
FIG. 7 illustrates an adjustable near-eye display visor in a number of configurations.

FIG. 7 illustrates an adjustable near-eye display visor in a number of configurations. An additional issue in HMD wearability is the ability for the user to return to the real-world conveniently. HMDs generally have a snug fit on the user's head. In some circumstances it inconvenient to take off the HMD entirely. Rather is preferable for the user to briefly be able to view the real-world again before returning to an immersive VR experience.

The adjustable HMD 82 includes an adjustable visor 84 attached to a head mount 86 via a hinge 88. The adjustable visor 84 includes the near-eye display of the HMD device. In use, the adjustable visor 84 is positioned in front of the user's eyes. When the user wishes to view the real-world again without taking the adjustable HMD 82 off, the user lifts the adjustable visor 84 to a raised position on their head and locks the visor in position via the hinge 88. The head mount 86 wraps fully around the user's head such that the visor 84 is not required to stabilize the adjustable HMD 82. The features of the adjustable HMD 82 may be used with the features of the hybrid HMD 20 such that an adjustable visor 84 is included in the same HMD as a neck-mounted unit 24.

Figure 8:
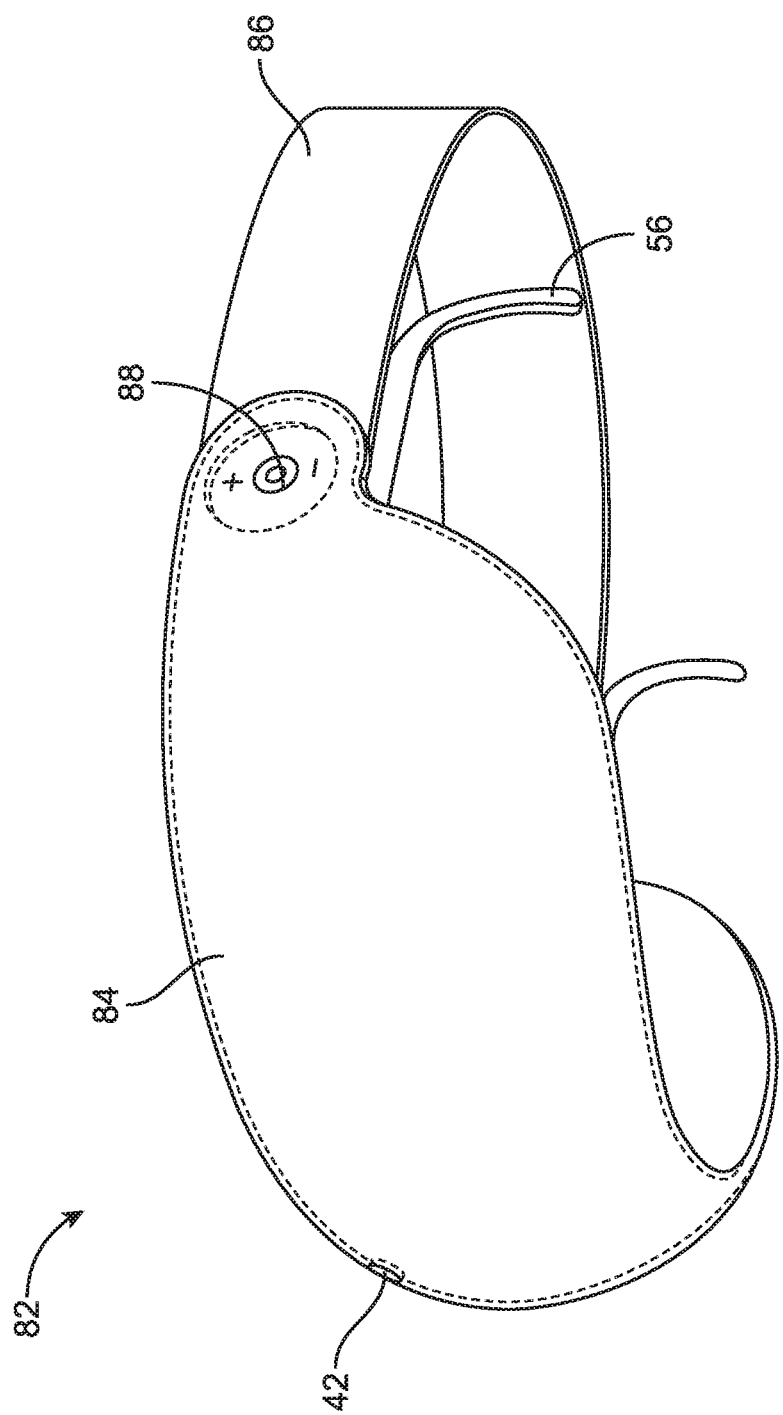
FIG. 8 illustrates a hinge mechanism for an adjustable near-eye display device.

FIG. 8 illustrates a hinge mechanism for an adjustable near-eye display device. FIG. 8 includes the same adjustable HMD 82 is the views of FIG. 7, though with increased focus on the hinge 88. Further illustrated are a number of the sensory suite components of the face-mounted unit 22 of the hybrid HMD 20 such as the front facing camera 42 and speakers 56.

Figure 9:
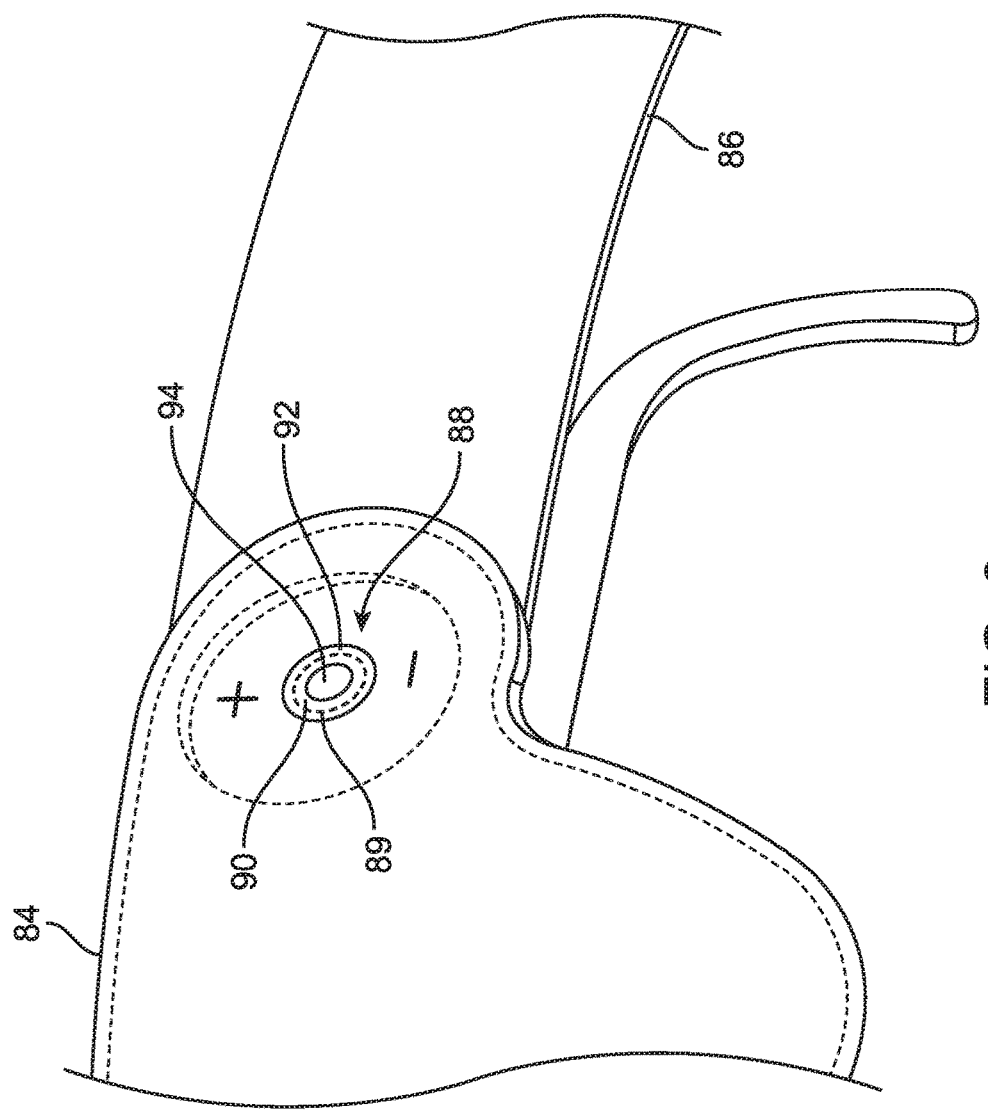
FIG. 9 is a block diagram illustrating a close up of an electrical connection within the hinge mechanism.

FIG. 9 is a block diagram illustrating a close up of an electrical connection within the hinge mechanism 88. In some embodiments, HMD components are located external to the visor 84. In order to accommodate those components with a wired connection there needs to be electrical conductivity through the hinge 88. There are a number of means of transmitting on digital signals and power through a hinge.

One such means includes a contact surface 89 between an inner ring 90 and outer ring 92 of the hinge 88. Each of the head mount 86 and the adjustable visor 84 is associated with one of either the inner ring or the outer ring 90, 92. Wiring connects each of the respective portions of the adjustable HMD 82 to the rings 90, 92. The contact surface 89 provides the necessary electrical connection there between.

An alternative means is to make use of the central area 94 of the hinge 88. In some embodiments, a wire merely runs through the central area 94. Alternatively, each side of the central area 94, respectively one side for the adjustable visor 84 and one side for the head mount 86, includes a contact surface.

Figure 10:
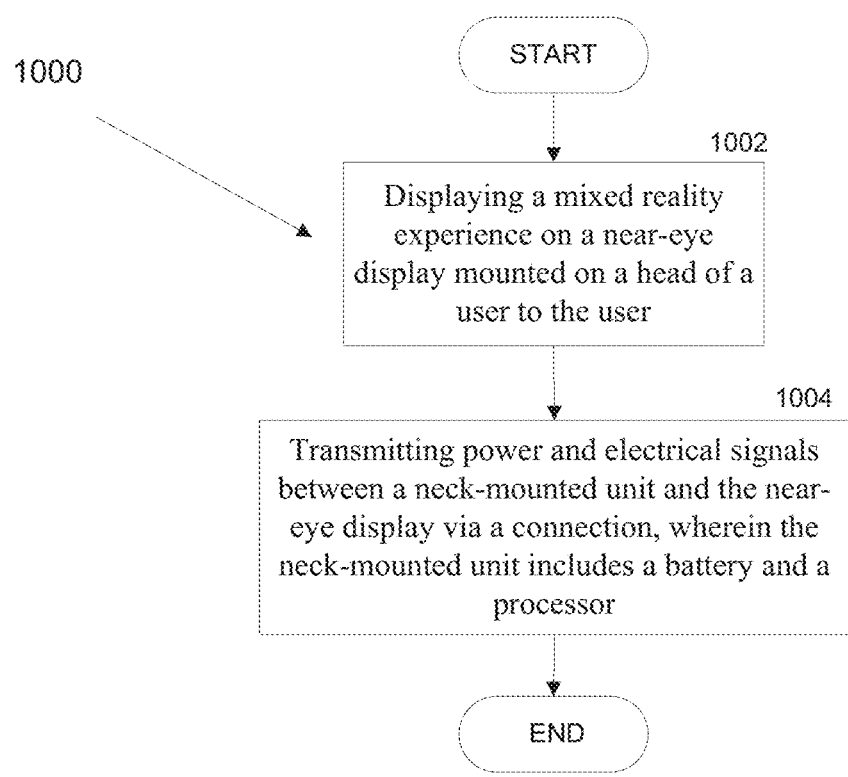
FIG. 10 is a flowchart illustrating a method for communicating between a face-mounted unit and a neck mounted-unit.

FIG. 10 is a flowchart illustrating a method for communicating between a face-mounted unit and a neck mounted-unit. When both a face-mounted unit and a neck-mounted unit are used, communication between the two is necessary. The connection between the two may be wired or wireless, and may pass either data, power, or both data and power. Additionally, if only one of the units includes a power source, power must be shared between the units. In step 1002, the HMD Displays a mixed reality experience on a near-eye display mounted on a head of a user to the user. In step 1004, a neck-mounted unit transmits power and electrical signals to the near-eye display via a connection, wherein the neck-mounted unit includes a battery and a processor.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

The invention claimed is:

1. A head mounted display (HMD), comprising:
   a head mount that encircles a head of a user that secures the HMD to the head;
   a near-eye display; and
   a hinge mechanically connecting the near-eye display to the means for securing, the hinge configured to enable the near-eye display to have a first position and a second position, wherein the first position is over eyes of the user and the second position is over a forehead or a frontal scalp region of the user, the hinge including a first contact surface associated with the head mount and a second contact surface associated with the near-eye display that form an electrical connection configured to carry electrical signals or electrical power between the near-eye display and the head mount, the first contact surface and second contact surface positioned on concentric wheels that are configured to fix a position relative to one another.

2. The HMD of claim 1, wherein the near-eye display is constructed so as to not contact the head of the user when in the first position.

3. The HMD of claim 1, wherein the near-eye display is constructed so as to not contact the head of the user when in the second position.

4. The HMD of claim 3, wherein the near-eye display is constructed in an arc shape.

5. The HMD of claim 1, wherein the near-eye display comprises:
   a mobile device; and
   a housing configured to secure the mobile device in a single position.

6. The HMD of claim 1, further comprising:
   an auxiliary module including processing or electrical power that is communicatively coupled with the near-eye display via the electrical connection by way of the head mount.

7. The HMD of claim 6, wherein the auxiliary module is neck-mounted.

8. The HMD of claim 1, the near-eye display further comprising any of:
   a binocular optical module;
   a camera sensor;
   an inertial measurement sensor;
   a microphone;
   a radar sensor;
   a LIDAR sensor;
   a proximity sensor;
   an eye gaze sensor; or
   speakers.

9. A head mounted display (HMD), comprising:
   a head band configured to encircle a head of a user and mount the HMD to the user; and
   an adjustable display unit that mechanically connected to the head band via a hinge including a first contact surface associated with the head band and a second contact surface associated with the adjustable display unit, the first contact surface and second contact surface are configured to carry electrical signals or electrical power between the adjustable display unit and the head band, the first contact surface and second contact surface positioned on concentric wheels that are configured to fix a position of the adjustable display unit in:
   a first position over eyes of the user; and
   a second position over a forehead or a frontal scalp region of the user.

10. The HMD of claim 9, wherein the adjustable display unit comprises of:
    a mobile device; and
    a housing configured to secure the mobile device in a single position.

11. The HMD of claim 9, further comprising:
    an auxiliary module including processing or electrical power that is communicatively coupled with the adjustable display unit via the physical electrical connection by way of the headband.

12. The HMD of claim 11, wherein the auxiliary module is neck-mounted.

13. The HMD of claim 9, the adjustable display unit further comprising any of:
    a binocular optical module;
    a camera sensor;
    an inertial measurement sensor;
    a microphone;
    a radar sensor;
    a LIDAR sensor;
    a proximity sensor;
    an eye gaze sensor; or
    speakers.

14. A head mounted display (HMD), comprising:
    a head band configured to encircle a head of a user and mount the HMD to the user;
    an adjustable housing unit that is configured to receive and secure a mobile device including a display screen, the adjustable housing unit mechanically connected to the head band via a hinge including a first contact surface associated with the head band and a second contact surface associated with the adjustable housing unit, the first contact surface and second contact surface configured to carry electrical signals or electrical power between the adjustable housing unit and the head band, the first contact surface and second contact surface positioned on concentric wheels that are configured to fix a position of the adjustable housing unit to:
- a first position over eyes of the user wherein when received, the display screen of the mobile device faces the eyes of the user; and
- a second position over a forehead or a frontal scalp region of the user wherein when received, the display screen of the mobile device is substantially removed from view of the user.

15. The HMD of claim 14, wherein the adjustable housing unit is constructed so as to not contact the head of the user when in the first position.

16. The HMD of claim 14, wherein the adjustable housing unit is constructed so as to not contact the head of the user when in the second position.

17. The HMD of claim 16, wherein the adjustable housing unit is constructed in an arc shape.

18. The HMD of claim 16, further comprising:
a peripheral control device.

* * * * *